(12) United States Patent
Gill

(10) Patent No.: US 6,831,816 B2
(45) Date of Patent: Dec. 14, 2004

(54) CPP SENSOR WITH IN-STACK BIASED FREE LAYER

(75) Inventor: Hardayal Singh Gill, Palo Alto, CA (US)

(73) Assignee: International Business Machines Corporation, Armonk, NY (US)

(*) Notice: Subject to any disclaimer, the term of this patent is extended or adjusted under 35 U.S.C. 154(b) by 71 days.

(21) Appl. No.: 10/197,272

(22) Filed: Jul. 15, 2002

(65) Prior Publication Data

US 2004/0008454 A1 Jan. 15, 2004

(51) Int. Cl.$^7$ ................................................. G11B 5/39
(52) U.S. Cl. ................................................. 360/324.12
(58) Field of Search ....................... 360/324.12, 324.11, 360/324.1, 324

(56) References Cited

U.S. PATENT DOCUMENTS

| | | | |
|---|---|---|---|
| 5,650,958 A | 7/1997 | Gallagher et al. | 365/173 |
| 6,178,074 B1 | 1/2001 | Gill | 360/324.2 |
| 6,185,080 B1 | 2/2001 | Gill | 360/324.2 |
| 6,219,274 B1 | 4/2001 | Shimazawa et al. | 365/158 |
| 6,296,741 B1 | 10/2001 | Pinarbasi | 204/192.11 |
| 6,338,899 B1 * | 1/2002 | Fukuzawa et al. | 428/332 |
| 6,473,279 B2 * | 10/2002 | Smith et al. | 360/324.12 |
| 6,556,390 B1 * | 4/2003 | Mao et al. | 360/324.1 |
| 6,563,681 B1 * | 5/2003 | Sasaki et al. | 360/324.12 |
| 6,621,667 B1 * | 9/2003 | He et al. | 360/324.12 |
| 6,661,623 B1 * | 12/2003 | Tsuchiya et al. | 360/324.12 |
| 6,683,762 B2 * | 1/2004 | Li et al. | 360/324.11 |
| 6,704,175 B2 * | 3/2004 | Li et al. | 360/324.11 |

OTHER PUBLICATIONS

*Research Disclosure*, Aug. 2001, No. 448144, "Exchange tab and in–stack bias structure for tunnel valve".
*Research Disclosure*, Aug. 2001, No. 448164, "In–stack HB structure for tunnel valve".

* cited by examiner

*Primary Examiner*—Angel Castro
(74) *Attorney, Agent, or Firm*—Ervin F. Johnston

(57) ABSTRACT

A magnetic head assembly includes a read head with a current perpendicular to the planes (CPP) sensor. The CPP sensor includes an AP pinned layer structure, a free layer and a spacer layer which is located between the free layer and the AP pinned layer structure. An in-stack longitudinal biasing structure for longitudinally biasing the free layer includes a pinned layer, an AFM pinning layer for pinning the pinned layer and a chromium spacer layer which is located between the pinned layer and the free layer. The free layer includes first and second free films with the first free film being iron and interfacing the spacer layer. The second free film may be nickel iron for imparting magnetic softness to the first free film. The pinned layer and a second AP pinned layer of the free layer structure may also be iron. The iron content of the layers in the sensor and the chromium spacer layer significantly increase the magnetoresistive coefficient dr/R of the CPP sensor.

31 Claims, 6 Drawing Sheets

CPP SENSOR WITH IN-STACK BIASED FREE LAYER

BACKGROUND OF THE INVENTION

1. Field of the Invention

The present invention relates to a current perpendicular to the planes (CPP) sensor with an in-stack biased free layer wherein the CPP sensor is either a CPP spin valve sensor or a tunnel junction sensor.

2. Description of the Related Art

The heart of a computer is typically a magnetic disk drive which includes a rotating magnetic disk, a slider that has write and read heads, a suspension arm above the rotating disk and an actuator arm. The suspension arm biases the slider into contact with a parking ramp or the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the actuator arm swings the suspension arm to place the write and read heads over selected circular tracks on the rotating disk where field signals are written and read by the write and read heads. The write and read heads are connected to processing circuitry that operates according to a computer program to implement the writing and reading functions.

An exemplary high performance read head employs a current perpendicular to the planes (CPP) sensor for sensing the magnetic field signals from the rotating magnetic disk. The sensor includes a nonmagnetic electrically conductive or electrically nonconductive material spacer layer sandwiched between a ferromagnetic pinned layer and a ferromagnetic free layer. An antiferromagnetic pinning layer typically interfaces the pinned layer for pinning the magnetic moment of the pinned layer 90° to an air bearing surface (ABS) wherein the ABS is an exposed surface of the sensor that faces the rotating disk. The sensor is located between ferromagnetic first and second shield layers. First and second leads are connected to a bottom and a top respectively of the sensor for conducting a current perpendicular to the major thin film planes (CPP) of the sensor. This is in contrast to a CIP sensor where the current is conducted in plane parallel to the major thin film planes (CIP) of the sensor. A magnetic moment of the free layer is free to rotate upwardly and downwardly with respect to the ABS from a quiescent or zero bias point position in response to positive and negative magnetic field signals from the rotating magnetic disk. The quiescent position of the magnetic moment of the free layer, which is parallel to the ABS, is when the current is conducted through the sensor without magnetic field signals from the rotating magnetic disk.

When the aforementioned material spacer layer is nonmagnetic and electrically conductive, such as copper, the current is referred to as a sense current, but when the material spacer layer is nonmagnetic and electrically nonconductive, such as aluminum oxide, the current is referred to as a tunneling current. Hereinafter, the current is referred to as a perpendicular current ($I_p$) which can be either a sense current or a tunneling current.

When the magnetic moments of the pinned and free layers are parallel with respect to one another the resistance of the sensor to the perpendicular current ($I_p$) is at a minimum and when their magnetic moments are antiparallel the resistance of the sensor to the perpendicular current ($I_p$) is at a maximum. Changes in resistance of the sensor is a function of cos θ, where θ is the angle between the magnetic moments of the pinned and free layers. When the perpendicular current ($I_p$) is conducted through the sensor, resistance changes, due to field signals from the rotating magnetic disk, cause potential changes that are detected and processed as playback signals. The sensitivity of the sensor is quantified as magnetoresistive coefficient dr/R where dr is the change in resistance of the sensor from minimum resistance (magnetic moments of free and pinned layers parallel) to maximum resistance (magnetic moments of the free and pinned layers antiparallel) and R is the resistance of the sensor at minimum resistance.

Sensors are classified as a bottom sensor or a top sensor depending upon whether the pinned layer is located near the bottom of the sensor close to the first read gap layer or near the top of the sensor close to the second read gap layer. Sensors are further classified as simple pinned or antiparallel (AP) pinned depending upon whether the pinned layer structure is one or more ferromagnetic layers with a unidirectional magnetic moment or a pair of ferromagnetic AP layers that are separated by a coupling layer with magnetic moments of the ferromagnetic AP layers being antiparallel. Sensors are still further classified as single or dual wherein a single sensor employs only one pinned layer and a dual sensor employs two pinned layers with the free layer structure located therebetween.

The first and second shield layers may engage the bottom and the top respectively of the CPP sensor so that the first and second shield layers serve as the aforementioned leads for conducting the perpendicular current through the sensor perpendicular to the major planes of the layers of the sensor. The read gap is the length of the sensor between the first and second shield layers. It should be understood that the thinner the gap length the higher the linear read bit density of the read head. This means that more bits can be read per inch along the track of a rotating magnetic disk which enables an increase in the storage capacity of the magnetic disk drive.

Assuming that the aforementioned pinning layers are platinum manganese (PtMn) each pinning layer has a thickness of approximately 150 Å which increases the read gap in a dual CPP sensor by 300 Å. This seriously impacts the linear read bit density of the read head. Further, the pinning layers significantly increase the resistance R of the sensor to the perpendicular current ($I_p$). The result is that the magnetoresistive coefficient dr/R of the sensor is decreased. The pinning layers also require extra steps in their fabrication and a setting process. After forming the sensor, the sensor is subjected to a temperature at or near a blocking temperature of the material of the pinning layer in the presence of a field which is oriented perpendicular to the ABS for the purpose of resetting the orientation of the magnetic spins of the pinning layer. The elevated temperature frees the magnetic spins of the pinning layer so that they align perpendicular to the ABS. This also aligns the magnetic moment of the pinned layer structure perpendicular to the ABS. When the read head is cooled to ambient temperature the magnetic spins of the pinning layer are fixed in the direction perpendicular to the ABS which pins the magnetic moment of the pinned layer structure perpendicular to the ABS. After resetting the pinning layer it is important that subsequent elevated temperatures and extraneous magnetic fields not disturb the setting of the pinning layer.

It is also important that the free layer be longitudinally biased parallel to the ABS and parallel to the major planes of the thin film layers of the sensor in order to magnetically stabilize the free layer. This is typically accomplished by first and second hard bias magnetic layers which abut first and second side surfaces of the spin valve sensor. Unfortunately, the magnetic field through the free layer between the first and second side surfaces is not uniform since a portion of the magnetization is lost in a central region of the free layer to the shield layers. This is especially troublesome when the track width of the sensor is sub-micron. End portions of the free layer abutting the hard bias layers are over-biased and become very stiff in their response to field signals from the rotating magnetic disk. The stiffened end portions can take up a large portion of the total length of a sub-micron sensor and can significantly reduce the amplitude of the sensor. It should be understood that a narrow track width is important for promoting the track width density of the read head. The more narrow the track width the greater the number of tracks that can be read per linear inch along a radius of the rotating magnetic disk. This further enables an increase in the magnetic storage capacity of the disk drive.

There is a strong-felt need to increase the magnetic storage of the disk drive as well as increasing the magnetoresistive coefficient dr/R of the CPP sensor.

SUMMARY OF THE INVENTION

An aspect of the invention is to provide an in-stack biasing structure, which is located within the track width of a current perpendicular to the planes (CPP) sensor, for longitudinally biasing the free layer of the sensor in a direction parallel to the ABS and parallel to the major planes of the layers of the sensor. In a preferred embodiment the biasing structure includes an iron pinned layer and a chromium spacer layer which is located between and interfaces the pinned layer and the free layer so that the pinned and free layers are magnetostatically coupled. The biasing layer structure further includes an antiferromagnetic (AFM) pinning layer which is exchange coupled to the pinned layer for pinning a magnetic moment of the pinned layer parallel to the ABS and parallel to the major planes of the layers of the sensor. The chromium spacer layer weakly antiparallel couples the iron pinned layer and the free layer and is in a direction to support the magnetostatic coupling between the pinned layer and the free layer. It has been found that a chromium layer with a thickness of approximately 10 Å weakly antiparallel couples the pinned and free layers. Because of the magnetostatic and AP couplings between the pinned and free layers the free layer is uniformly biased from a first side surface to a second side surface. This biasing is more uniform than the aforementioned first and second hard bias layers adjacent the side surfaces of the free layer since the hard bias layers result in overbiasing end regions of the free layer and restricting the employment of narrow track width sensors.

An aspect of the invention is that the free layer includes first and second free films with the first free film interfacing the material spacer layer and the second free film interfacing the chromium spacer layer. In a preferred embodiment the first free film is composed of only iron (Fe) and the second free film is composed of nickel iron (NiFe). Accordingly, the second free film is magnetically softer than the first film and imparts softness to the first film so that both the first and second free films rotate responsively to a field signal from a moving magnetic medium. Most importantly, however, is that the iron composition of the first film and the pinned layer in combination with the chromium spacer layer significantly increases the magnetoresistance dr/R of the CPP sensor. This is also true when only the pinned layer is composed of iron, but the dr/R is still further increased when the first free film is also composed of iron.

This embodiment of the invention may employ an AP pinned layer structure with a second AFM pinning layer pinning one of the AP pinned layers of the AP pinned layer structure or a self-pinning antiparallel (AP) pinned layer structure without an AFM pinning layer pinning the AP pinned layer structure. The self-pinning is accomplished by uniaxial anisotropies of the AP pinned layers which are oriented perpendicular to the ABS and, in combination, self-pin the magnetic moments of the first and second AP pinned layers perpendicular to the ABS and antiparallel with respect to each other. The use of the self-pinning scheme permits the employment of a single antiferromagnetic material, which material is used for the AFM pinning layer in the biasing structure. This is made possible by the fact that the AP pinned layer structure is self-biasing and does not require the AFM pinning layer. Accordingly, after fabricating the read head the magnetic spins of the AFM pinning layer in the biasing structure can be set by elevating the temperature at or near the blocking temperature of the AFM material in the presence of a field that is oriented parallel to the ABS and parallel to the major planes of the layers of the sensor. Upon removing the elevated temperature, the magnetic spins of the AFM pinning layer are set to pin the magnetic moment of the pinned layer parallel to the ABS and parallel to the planes of the layers of the sensor. This does not affect the perpendicular orientation of the AP pinned layers of the AP pinned layer structure since these layers are not pinned by an AFM pinning layer. The preferred AFM material for the pinning layer of the biasing structure is platinum manganese. In either the AFM pinned AP pinned layer structure or the self-pinned AP pinned layer structure it is preferred that the second AP pinned layer interfacing the spacer layer be composed of iron (Fe) and the first AP pinned layer be cobalt iron (CoFe). By making the second AP pinned layer of iron this further increases the magnetoresistive coefficient dr/R of the CPP sensor, as discussed hereinabove. Commonly assigned U.S. Pat. No. 6,127,053 is incorporated in its entirety regarding self-pinned AP pinned layer structures.

An object is to provide a CPP sensor wherein a free layer is more uniformly biased and a magnetoresistive coefficient dr/R is increased.

Another object is to provide layers of the sensor with compositions which increase the magnetoresistive coefficient dr/R of the sensor.

A further object is to provide a method for making the aforementioned CPP sensor.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
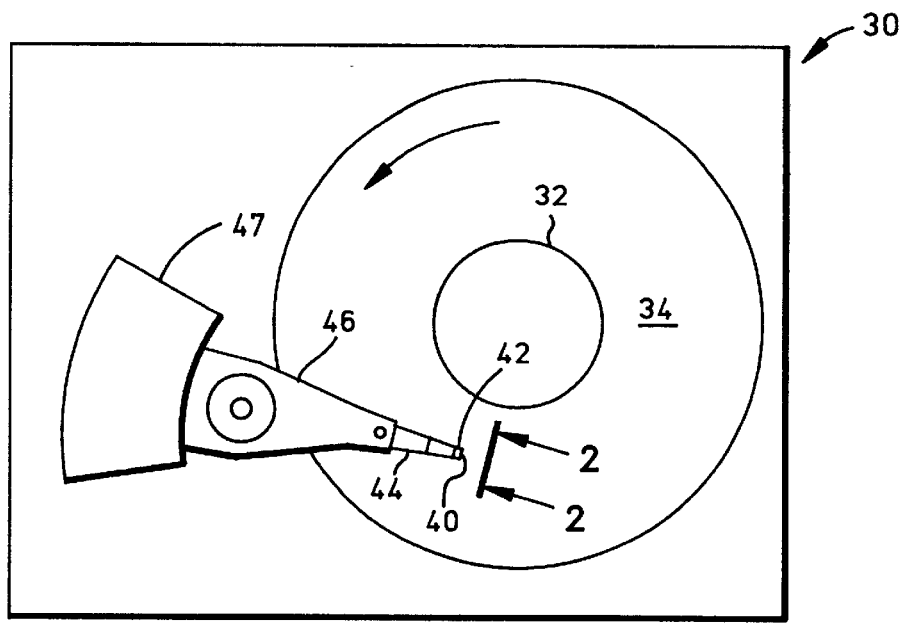
FIG. 1 is a plan view of an exemplary prior art magnetic disk drive.
Figure 2:
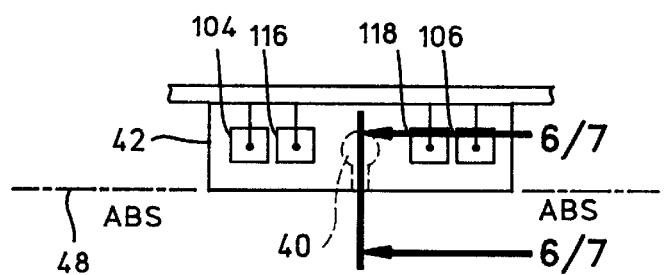
FIG. 2 is an end view of a slider with a magnetic head of the disk drive as seen in plane 2—2 of FIG. 1.
Figure 3:
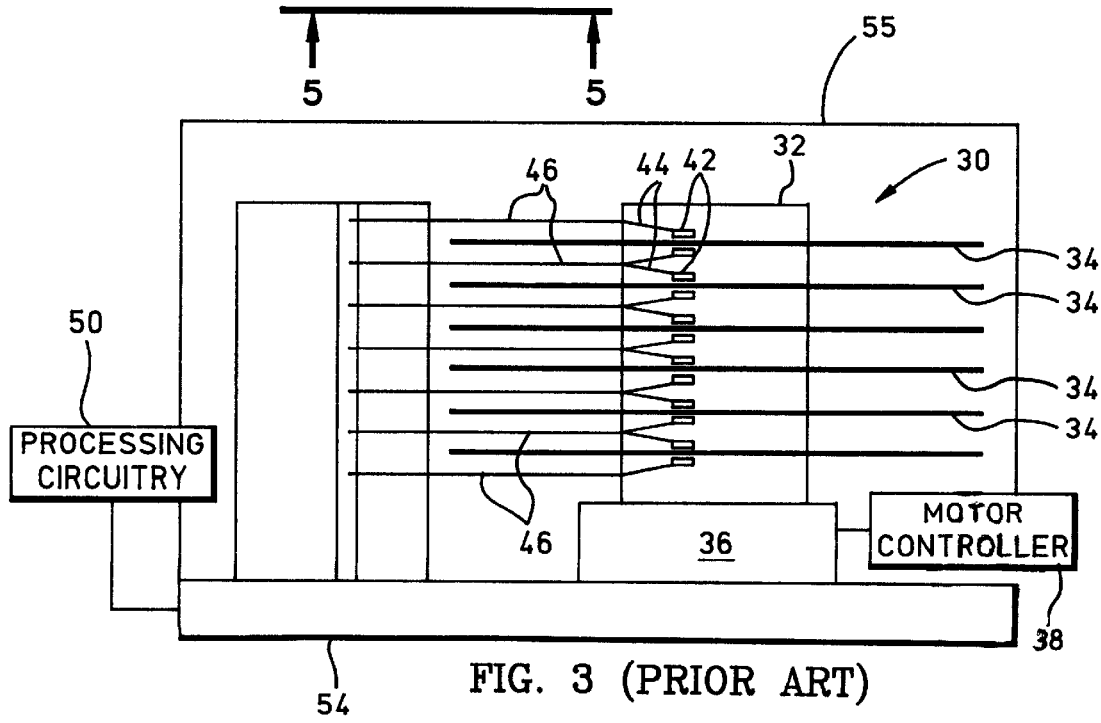
FIG. 3 is an elevation view of the magnetic disk drive wherein multiple disks and magnetic heads are employed.
Figure 4:
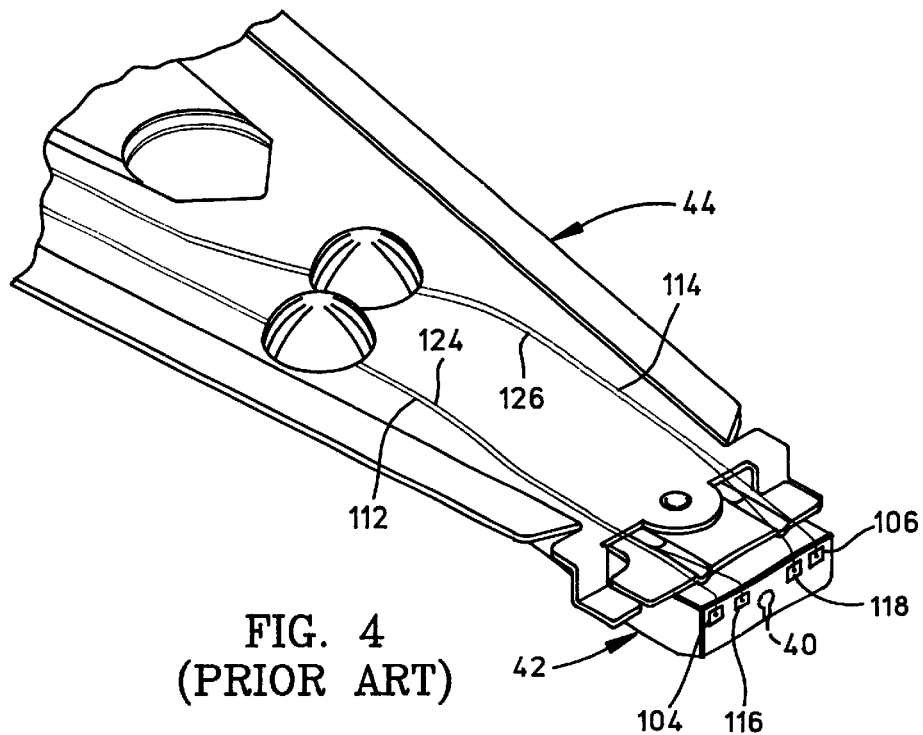
FIG. 4 is an isometric illustration of an exemplary prior art suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.01 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
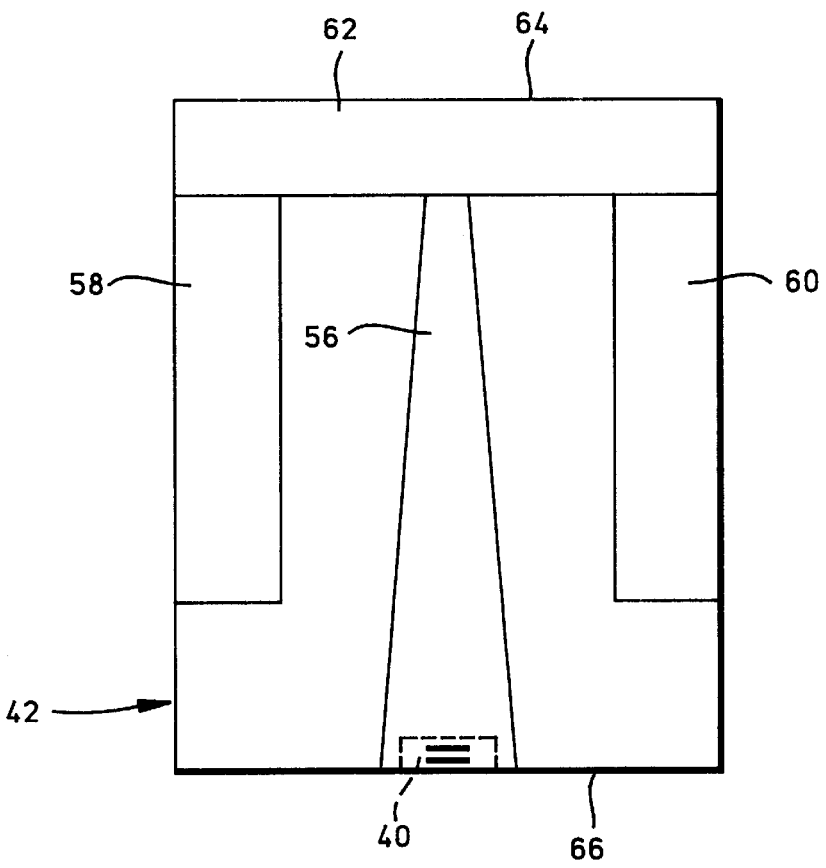
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figures 6, 7, 8:
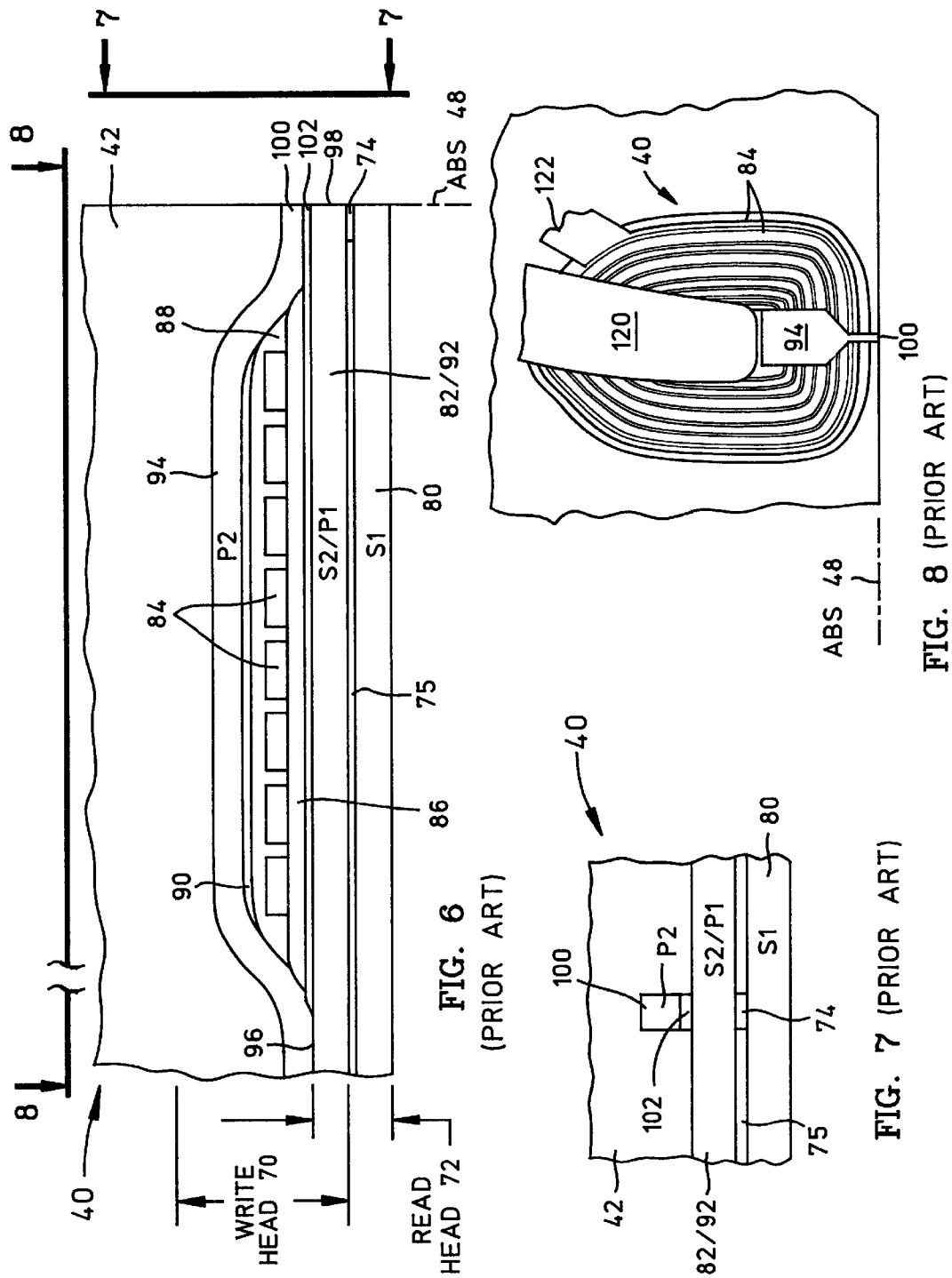
FIG. 6 is a partial view of the slider and a merged magnetic head as seen in plane 6—6 of FIG. 2.
FIG. 7 is a partial ABS view of the slider taken along plane 7—7 of FIG. 6 to show the read and write elements of the magnetic head.
FIG. 8 is a view taken along plane 8—8 of FIG. 6 with all material above the coil layer and leads removed.

FIG. 6 is a side cross-sectional elevation view of a merged magnetic head 40, which includes a write head portion 70 and a read head portion 72, the read head portion employing a CPP sensor 74. FIG. 7 is an ABS view of FIG. 6. The CPP sensor 74 is sandwiched between ferromagnetic first and second shield layers 80 and 82 which may serve as first and second leads connected to the processing circuitry 50 in FIG. 3 for conducting a perpendicular current $I_p$ through the sensor perpendicular to major planes of the layers of the sensor. In response to external magnetic fields, the resistance of the sensor 74 changes. When the current $I_p$ is conducted through the sensor the resistance changes cause potential changes which are processed as readback signals by the processing circuitry 50 shown in FIG. 3.

The write head portion 70 of the magnetic head 40 includes a coil layer 84 which is sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. Since the second shield layer 82 and the first pole piece layer 92 are a common layer this head is known as a merged head. In a piggyback head (not shown) the layers 82 and 92 are separate layers and are separated by an insulation layer. As shown in FIGS. 2 and 4, first and second solder connections 104 and 106 connect leads from the sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
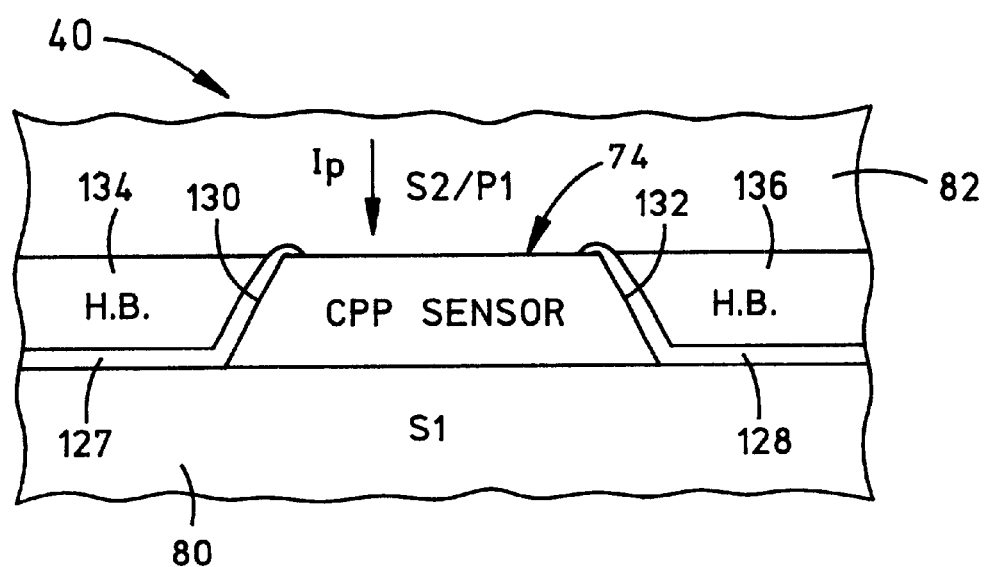
FIG. 9 is an enlarged isometric ABS illustration of a read head which has a CPP sensor.

FIG. 9 is an enlarged isometric ABS illustration of the prior art read head portion shown in FIG. 7. The read head includes the CPP sensor 74. First and second insulation layers 127 and 128, such as alumina ($Al_2O_3$), cover the first shield layer 80 on each side of the sensor 74 as well as slightly covering first and second side walls 130 and 132 of the sensor. First and second hard bias layers (H.B.) 134 and 136 are on the insulation layers 127 and 128 and are adjacent the side walls 130 and 132. The hard bias layers 134 and 136 cause magnetic fields to extend longitudinally through the sensor 74 for stabilizing the free layer. The sensor 74 and the first and second hard bias layers 134 and 136 are located between ferromagnetic first and second shield layers 80 and 82 which may serve as leads for conducting the perpendicular current ($I_p$) through the sensor 74.

Unfortunately, the first and second hard bias layers 134 and 136 in FIG. 9 do not uniformly stabilize the free layer within the sensor 74. Hard bias layers typically stiffen the magnetic moment of the free layer at end portions of the sensor abutting the hard bias layers so that these portions are stiff in their response to field signals from the rotating magnetic disk. With submicron track widths, this loss, which can be 0.1 $\mu$m in width at each end of the sensor, is unacceptable. Further, a central portion of the free layer may not be properly stabilized since magnetic flux is progressively drawn in by the first and second shield layers 80 and 82 as the flux lines from the hard bias layers extend between the side walls 130 and 132.

The Invention

Figure 10:
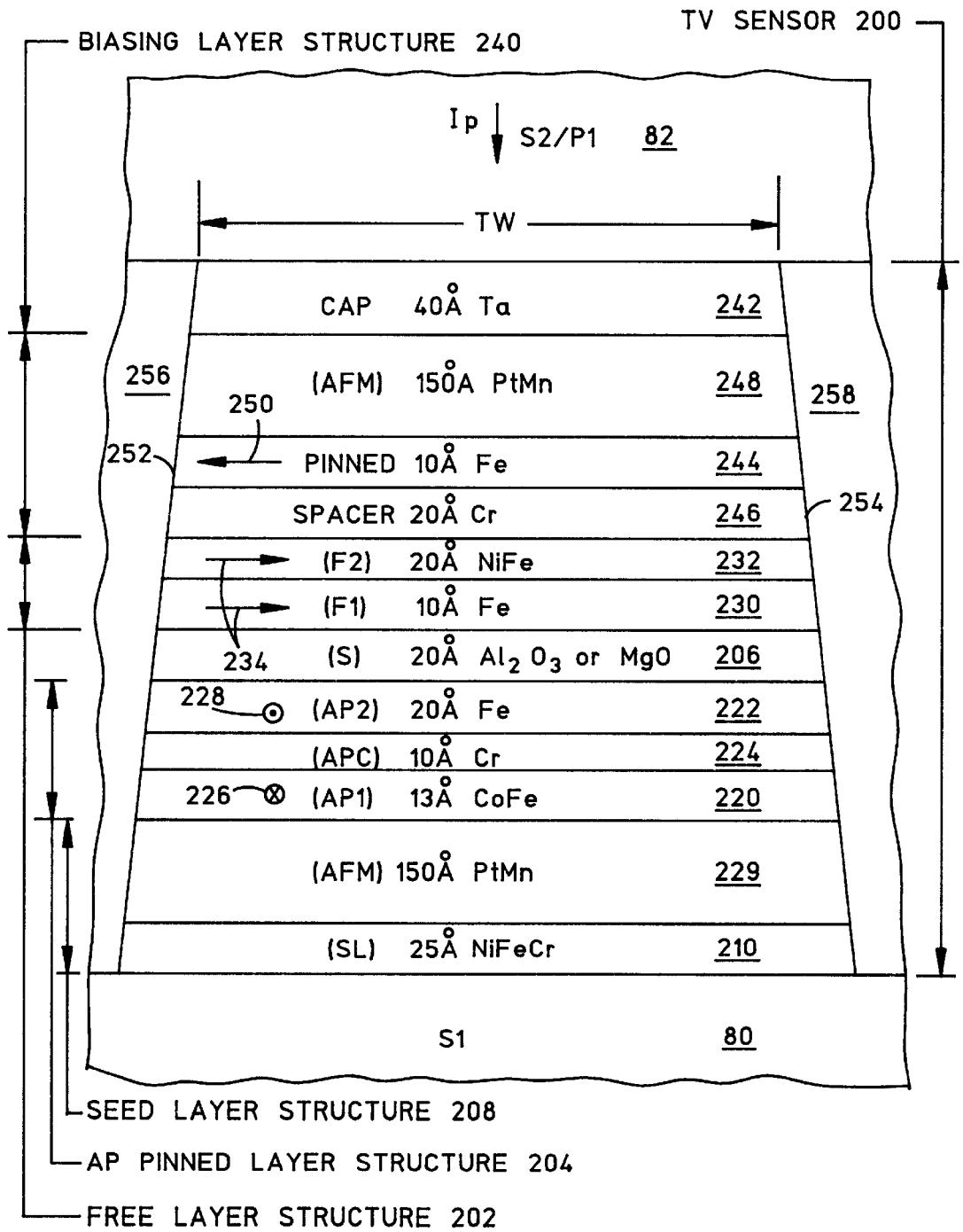
FIG. 10 is an ABS illustration of a first embodiment of the present CPP sensor.

One embodiment of the present sensor is a tunnel valve (TV) CPP sensor 200 as illustrated in FIG. 10 wherein the sensor is located between the first and second shield layers 80 and 82 which serve as first and second lead layers. The first and second shield layers 80 and 82 conduct a perpendicular current $I_p$ through the sensor perpendicular to the major planes of the layers of the sensor. The CPP sensor 200 includes a free layer structure 202 and an antiparallel (AP) pinned layer structure 204. A nonmagnetic electrically conductive or nonconductive material spacer layer (S) 206 is located between the free layer structure 202 and the AP pinned layer structure 204 wherein the material spacer layer is preferably aluminum oxide ($Al_2O_3$) or magnesium oxide (MgO). Because the free layer structure 202 is located between the AP pinned layer structure 204 and the second shield layer 82 the spin valve sensor 200 is a bottom spin valve sensor. A seed layer structure 210 may be located between the first shield layer 80 and the AP pinned layer structure 204 for promoting a desirable texture of the layers deposited thereon.

Figure 11:
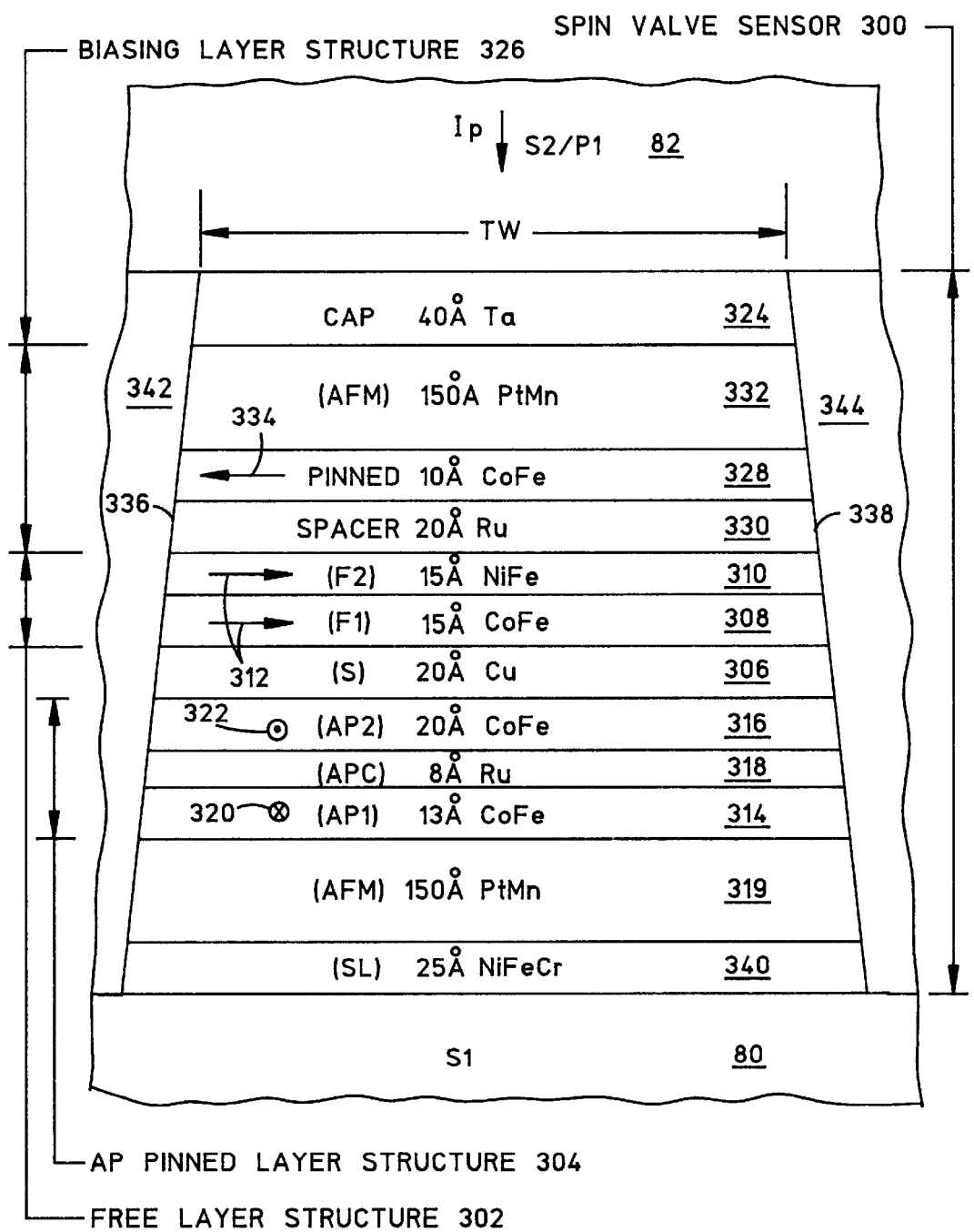
FIG. 11 is an ABS illustration of a second embodiment of the present CPP sensor.

The AP pinned layer structure 204 includes ferromagnetic first and second AP pinned layers (AP1) and (AP2) 220 and 222. A nonmagnetic electrically conductive antiparallel coupling (APC) layer 224 is located between and interfaces the first and second AP pinned layers 220 and 222. The first AP pinned layer 220 has a magnetic moment 226 which is oriented perpendicular to the ABS in a direction, either toward the ABS or away from the ABS, as shown in FIG. 10, and the second AP pinned layer has a magnetic moment 228 which is oriented antiparallel to the magnetic moment 226 by a strong antiparallel coupling between the first and second AP pinned layers 220 and 222. The preferred material for the first and second AP pinned layers 220 and 222 is cobalt iron (CoFe) and iron (Fe) respectively. A second AFM pinning layer interfaces the first AP pinned layer 220 and pins its magnetic moment 226 into the sensor as shown in FIG. 11. It should be understood that with the embodiment shown in FIG. 11 that the AFM pinning layer 229 may be employed or omitted. If the AFM pinning layer 229 is omitted the AP pinned layer structure is self-pinning as discussed hereinabove.

The free layer structure 202 may include first and second free layers (F1) and (F2) 230 and 232. The preferred material for the first AP pinned layer 220 is cobalt iron (CoFe) and the preferred material for the second AP pinned layer 222 is iron (Fe). The importance of the iron second AP pinned layer 222 will be discussed hereinafter. The free layer structure has a magnetic moment 234 which is oriented parallel to the ABS and parallel to the major thin film planes of the layers. When a field signal from the rotating magnetic disk rotates the magnetic moment 234 into the sensor the magnetic moments 234 and 228 become more antiparallel which increases the resistance of the sensor to the perpendicular current $I_p$ and when a field signal rotates the magnetic moment 234 out of the sensor the magnetic moments 234 and 228 become more parallel which decreases the resistance of the sensor to the perpendicular current $I_p$. These resistance changes cause potential changes within the processing circuitry 50 in FIG. 3 which are processed as playback signals.

An in-stack biasing layer structure 240 is located within the stack of the spin valve sensor and within the track width of the sensor for longitudinally biasing the magnetic moment 234 of the free layer structure parallel to the ABS and parallel to the major planes of the layers of the sensor, which planes define the thicknesses of the layers. A cap layer 242 is located on the biasing layer structure for protecting it from subsequent processing steps. The biasing layer structure 240 includes a ferromagnetic pinned layer 244 and a chromium (Cr) spacer layer 246 which is located between and interfaces the free layer structure 202 and the pinned layer 244. The biasing layer structure 240 further includes an antiferromagnetic (AFM) pinning layer 248 which interfaces and is exchange coupled to the pinned layer 244 for pinning a magnetic moment 250 of the pinned layer parallel to the ABS and parallel to the major thin film planes of the layers of the sensor. Because of the chromium spacer layer 246 the pinned layer 244 is magnetostatically coupled to the free layer structure 202 so there is flux closure therebetween. Further, the chromium spacer layer 246 is sized in thickness so that there is a weak antiparallel (AP) coupling between the pinned layer 244 and the free layer structure 202. It has been found that when the thickness of the chromium layer is 20 Å a weak antiparallel coupling is provided. The antiparallel coupling supports the magnetostatic coupling between the pinned layer 244 and the free layer structure 202 for longitudinally stabilizing the free layer structure, which stabilization is uniform between the side surfaces 252 and 254. This overcomes the problem of the aforementioned stiffening of the end regions of the free layer structure which limits narrow track width sensors. Insulation layers 256 and 258 contact the side surfaces 252 and 254 of the sensor for preventing shunting of the perpendicular current $I_p$.

It should be noted that each of the pinned layer 244, the first free film 230 and the second AP pinned layer 222 are composed of iron (Fe). The iron composition of these layers significantly increases the magnetoresistive coefficient dr/R of the CPP sensor. It is preferred that all three of these layers be composed of iron (Fe), however, improvement is obtained with any one of the se layers being composed of iron (Fe). The chromium spacer layer 246 is especially preferred for providing a weak AP coupling between an iron (Fe) pinned layer 244 and the free layer structure 202. Accordingly, the chromium composition of the spacer layer 246 further increases the magnetoresistive coefficient dr/R of the sensor. A suitable range of thicknesses for the chromium layer to establish a weak AP coupling between the pinned layer 244 and the free layer structure 202 is 10 Å to 20 Å. Other preferred thicknesses and materials of the layers are shown in FIG. 11.

Another embodiment of the present sensor is a spin valve CPP sensor 300 as illustrated in FIG. 11. The sensor 300 includes a free layer structure 302, an antiparallel (AP) pinned layer structure 304 and a material spacer layer (S) 306 which is located between and interfaces the free layer structure 302 and the AP pinned layer structure 304 wherein the material spacer layer is copper (Cu). The free layer structure 302 may have first and second free layers (F1) and (F2) 308 and 310 with the first free layer 308 being nickel iron and the second free layer 310 being cobalt iron with the first free layer 308 interfacing the material spacer layer 306 for improving the magnetoresistive coefficient dr/R of the sensor. The free layer structure 302 has a magnetic moment 312 which is parallel to the ABS and parallel to the major planes of the sensor in a direction from right to left or from left to right, as shown in FIG. 11.

The AP pinned layer structure 304 includes ferromagnetic first and second AP pinned layers (AP1) and (AP2) 314 and 316 and an antiparallel coupling (APC) layer 318 which is located between and interfaces the first and second AP pinned layers 314 and 316. The AP pinned layers 314 and 316 have magnetic moments 320 and 322 which are oriented perpendicular to the ABS and antiparallel with respect to one another. In this embodiment an antiferromagnetic (AFM) pinning layer 319 interfaces the first AP pinned layer 324 for pinning its magnetic moment 320 into the sensor as shown in FIG. 11. The operation of the CPP sensor 300 in response to field signals from the rotating magnetic disk is the same as that described hereinabove for the spin valve sensor 200 in FIG. 10. A cap layer 324 may be located on the AP pinned layer structure 304 for protecting it from subsequent processing steps.

An in-stack biasing layer structure 326 is located in the stack of the sensor and within the track width for longitudinally biasing the magnetic moment 312 of the free layer structure 302. The biasing layer structure 326 may include a ferromagnetic pinned layer 328 and a nonmagnetic electrically conductive spacer layer 330 which is located between and interfaces the pinned layer 328 and the free layer structure 302. An antiferromagnetic (AFM) pinning layer 332 interfaces and is exchange coupled to the pinned layer 328 for pinning a magnetic moment 334 of the pinned layer parallel to the ABS and parallel to the planes of the layers of the sensor. The spacer layer 330 causes the pinned layer 328 and the free layer structure 302 to be magnetostatically and AP coupled for stabilizing the magnetic moment 312 of the free layer structure parallel to the ABS and parallel to the major planes of the sensor as shown in FIG. 11. This biasing is uniform from a first side surface 336 to a second side surface 338 of the free layer structure so that the biasing does not cause a limitation on narrow track width sensors. A seed layer (SL) 340 may be located between the first shield layer 80 and the pinning layer 319 for promoting improved texture of the layers deposited thereon. Insulation layers 342 and 344 contact the side surfaces 336 and 338 for preventing shunting of the sense current $I_s$ through the sensor 300. Exemplary thicknesses and materials of the layers of the sensor 300 are shown in FIG. 11.

Discussion

It should be understood that the material spacer layer may be either aluminum oxide ($Al_2O_3$) or copper (Cu). When the material spacer layer is aluminum oxide the sensor is referred to as a tunneling CPP sensor and when the material spacer layer is copper the sensor is referred to as a CPP spin valve sensor. The invention is applicable to either type of these sensors. Magnesium oxide (MgO) may be substituted for aluminum oxide ($Al_2O_3$). Further, it should be understood that either of the sensors in FIGS. 10 and 11 may be a top CPP sensor instead of a bottom CPP sensor as shown. In a top CPP sensor the layers shown in FIGS. 10 and 11 are inverted except for the cap layer and the seed layer. Further, either of the sensors may be employed in the read head 40 shown in FIG. 6 and the magnetic disk drive shown in FIG. 3.

Clearly, other embodiments and modifications of this invention will occur readily to those of ordinary skill in the art in view of these teachings. For instance, the slider supporting the sensor may have a head surface other than the aforementioned ABS, such as a tape surface for use in a tape drive. Therefore, this invention is to be limited only by the following claims, which include all such embodiments and modifications when viewed in conjunction with the above specification and accompanying drawings.

I claim:

1. A magnetic head assembly, that has a head surface for facing a magnetic medium, comprising:
    a read head that includes a CPP sensor;
    the CPP sensor including:
        an antiparallel (AP) pinned layer structure;
        a ferromagnetic free layer having a magnetic moment that is free to rotate in response to a field signal; and
        a material spacer layer located between the free layer and the AP pinned layer structure;
    the free layer including:
        first and second free films;
        the first free film consisting of iron (Fe) and interfacing the material spacer layer; and
        the second free film being composed of nickel iron (NiFe) and interfacing the first free film;
    the antiparallel (AP) pinned layer structure including:
        ferromagnetic first and second antiparallel (AP) pinned layers; and
        an antiparallel (AP) coupling layer located between and interfacing the first and second AP pinned layers;
        an in-stack longitudinal biasing layer structure located within a track width of the sensor;
    the in-stack longitudinal biasing structure including:
        a ferromagnetic pinned layer having a magnetic moment;
        an antiferromagnetic (AFM) pinning layer exchange coupled to the pinned layer for pinning the magnetic moment of the pinned layer parallel to the head surface and parallel to major thin film planes of the layer of the sensor; and
        a chromium spacer layer located between the pinned layer and the free layer;
    the free layer being magnetostatically coupled to the pinned layer;
    the chromium spacer layer being sufficiently thin so that the free layer is weakly antiparallel (AP) coupled to the pinned layer;
    the magnetostatic coupling and the AP coupling supporting one another to stabilize the free layer, but being sufficiently weak in combination to permit the free layer to freely respond to magnetic field signals; and
    first and second leads connected to the sensor for conducting a current through the sensor perpendicular to major planes of the layers of the sensor.

2. A magnetic head assembly as claimed in claim 1 wherein the material spacer layer is copper (Cu).

3. A magnetic head assembly, that has a head surface for facing a magnetic medium, comprising:
    a read head that includes a CPP sensor;
    the CPP sensor including:
        an antiparallel (AP) pinned layer structure;
        a ferromagnetic free layer having a magnetic moment that is free to rotate in response to a field signal;
    the free layer including:
        first and second free films;
        the first free film consisting of iron (Fe); and
        the second free film being composed of nickel iron (NiFe);
    a material spacer layer located between the free layer and the AP pinned layer structure;
    the antiparallel (AP) pinned layer structure including:
        ferromagnetic first and second antiparallel (AP) pinned layers; and
        an antiparallel (AP) coupling layer located between and interfacing the first and second AP pinned layers;
        the second AP pinned layer interfacing the material spacer layer and consisting of iron (Fe);
        an in-stack longitudinal biasing layer structure located within a track width of the sensor;
    the in-stack longitudinal biasing structure including:
        a ferromagnetic pinned layer having a magnetic moment;
        an antiferromagnetic (AFM) pinning layer exchange coupled to the pinned layer for pinning the magnetic moment of the pinned layer parallel to the head surface and parallel to major thin film planes of the layer of the sensor; and
        a chromium spacer layer located between the pinned layer and the free layer;
    the free layer being magnetostatically coupled to the pinned layer;
    the chromium spacer layer being sufficiently thin so that the free layer is weakly antiparallel (AP) coupled to the pinned layer;
    the magnetostatic coupling and the AP coupling supporting one another to stabilize the free layer, but being sufficiently weak in combination to permit the free layer to freely respond to magnetic field signals; and first and second leads connected to the sensor for conducting a current through the sensor perpendicular to major planes of the layers of the sensor.

4. A magnetic head assembly as claimed in claim 3 further comprising:
a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions.

5. A magnetic head assembly as claimed in claim 4 including:
a second antiferromagnetic pinning layer exchange coupled to the first AP pinned layer for pinning the magnetic moment of the first AP pinned layer perpendicular to the head surface.

6. A magnetic head assembly as claimed in claim 4 wherein the material spacer layer is aluminum oxide ($Al_2O_3$) or magnesium oxide (MgO).

7. A magnetic head assembly, that has a head surface for facing a magnetic medium, comprising:
a read head that includes a CPP sensor;
the CPP sensor including:
an antiparallel (AP) pinned layer structure;
a ferromagnetic free layer having a magnetic moment that is free to rotate in response to a field signal; and
a material spacer layer located between the free layer and the AP pinned layer structure;
the free layer including:
first and second free films;
the first free film consisting of iron (Fe) and interfacing the material spacer layer; and;
the second free film being composed of nickel iron (NiFe) and interfacing the first free film;
the antiparallel (AP) pinned layer structure including:
ferromagnetic first and second antiparallel (AP) pinned layers; and
an antiparallel (AP) coupling layer located between and interfacing the first and second AP pinned layers;
an in-stack longitudinal biasing layer structure located within a track width of the sensor;
the in-stack longitudinal biasing structure including:
a ferromagnetic pinned layer having a magnetic moment;
an antiferromagnetic (AFM) pinning layer exchange coupled to the pinned layer for pinning the magnetic moment of the pinned layer parallel to the head surface and parallel to major thin film planes of the layer of the sensor;
a chromium spacer layer located between the pinned layer and the free layer; and
the pinned layer consisting of iron (Fe); and
the free layer being magnetostatically coupled to the pinned layer;
the chromium spacer layer being sufficiently thin so that the free layer is weakly antiparallel (AP) coupled to the pinned layer;
the magnetostatic coupling and the AP coupling supporting one another to stabilize the free layer, but being sufficiently weak in combination to permit the free layer to freely respond to magnetic field signals; and
first and second leads connected to the sensor for conducting a current through the sensor perpendicular to major planes of the layers of the sensor.

8. A magnetic head assembly, that has a head surface for facing a magnetic medium, comprising:
a read head that includes a CPP sensor;
the CPP sensor including:
an antiparallel (AP) pinned layer structure;
a ferromagnetic free layer having a magnetic moment that is free to rotate in response to a field signal; and
a material spacer layer located between the free layer and the AP pinned layer structure;
the free layer including:
first and second free films;
the first free film consisting of iron (Fe); and
the second free film being composed of nickel iron (NiFe);
the antiparallel (AP) pinned layer structure including:
ferromagnetic first and second antiparallel (AP) pinned layers;
an antiparallel (AP) coupling layer located between and interfacing the first and second AP pinned layers;
the second AP pinned layer interfacing the material spacer layer and consisting of iron (Fe); and
an in-stack longitudinal biasing layer structure located within a track width of the sensor;
the in-stack longitudinal biasing structure including:
a ferromagnetic pinned layer having a magnetic moment;
an antiferromagnetic (AFM) pinning layer exchange coupled to the pinned layer for pinning the magnetic moment of the pinned layer parallel to the head surface and parallel to major thin film planes of the layer of the sensor;
a chromium spacer layer located between the pinned layer and the free layer; and
the pinned layer consisting of iron (Fe); and
the free layer being magnetostatically coupled to the pinned layer;
the chromium spacer layer being sufficiently thin so that the free layer is weakly antiparallel (AP) coupled to the pinned layer;
the magnetostatic coupling and the AP coupling supporting one another to stabilize the free layer, but being sufficiently weak in combination to permit the free layer to freely respond to magnetic field signals; and
first and second leads connected to the sensor for conducting a current through the sensor perpendicular to major planes of the layers of the sensor.

9. A magnetic head assembly as claimed in claim 8 further comprising:
a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions.

10. A magnetic head assembly as claimed in claim 9 wherein the material spacer layer is aluminum oxide ($Al_2O_3$) or magnesium oxide (MgO).

11. A magnetic head assembly as claimed in claim 8 including:
a second antiferromagnetic pinning layer exchange coupled to the first AP pinned layer for pinning the magnetic moment of the first AP pinned layer perpendicular to the head surface.

12. A magnetic disk drive including at least one magnetic head assembly that has a head surface for facing a magnetic medium and that includes a write head and a read head, comprising:
the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions;
the read head including:
ferromagnetic first and second shield layers; and
a CPP sensor located between the first and second shield layers;
the CPP sensor including:
an antiparallel (AP) pinned layer structure;
a ferromagnetic free layer having a magnetic moment that is free to rotate in response to a field signal; and
a material spacer layer located between the free layer and the AP pinned layer structure;
the free layer including:
first and second free films;
the first free film consisting of iron (Fe) and interfacing the material spacer layer; and;
the second free film being composed of nickel iron (NiFe) and interfacing the first free film;
the antiparallel (AP) pinned layer structure including:
ferromagnetic first and second antiparallel (AP) pinned layers; and
an antiparallel (AP) coupling layer located between and interfacing the first and second AP pinned layers;
an in-stack longitudinal biasing layer structure located within a track width of the sensor;
the in-stack longitudinal biasing layer including:
a ferromagnetic pinned layer having a magnetic moment;
an antiferromagnetic (AFM) pinning layer exchange coupled to the pinned layer for pinning the magnetic moment of the pinned layer parallel to the head surface and parallel to major thin film planes of the layer of the sensor; and
a chromium spacer layer located between the pinned layer and the free layer;
first and second leads connected to the sensor for conducting a current through the sensor perpendicular to major planes of the layers of the sensor;
a housing;
the magnetic medium being supported in the housing;
a support mounted in the housing for supporting the magnetic head assembly with said head surface facing the magnetic medium so that the magnetic head assembly is in a transducing relationship with the magnetic medium;
a motor for moving the magnetic medium; and
a processor connected to the magnetic head assembly and to the motor for exchanging signals with the magnetic head assembly and for controlling movement of the magnetic medium.

13. A magnetic disk drive as claimed in claim 12 wherein the pinned layer consists of iron (Fe).

14. A magnetic disk drive as claimed in claim 12 wherein the material spacer layer is copper (Cu).

15. A magnetic disk drive including at least one magnetic head assembly that has a head surface for facing a magnetic medium and that includes a write head and a read head, comprising:
the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions;
the read head including:
ferromagnetic first and second shield layers; and
a CPP sensor located between the first and second shield layers;
the CPP sensor including:
an antiparallel (AP) pinned layer structure;
a ferromagnetic free layer having a magnetic moment that is free to rotate in response to a field signal; and
a material spacer layer located between the free layer and the AP pinned layer structure;
the free layer including:
first and second free films;
the first free film consisting of iron (Fe); and
the second free film being composed of nickel iron (NiFe);
the antiparallel (AP) pinned layer structure including:
ferromagnetic first and second antiparallel (AP) pinned layers;
an antiparallel (AP) coupling layer located between and interfacing the first and second AP pinned layers; and
the second AP pinned layer interfacing the material spacer layer and consisting of iron (Fe);
an in-stack longitudinal biasing layer structure located within a track width of the sensor;
the in-stack longitudinal biasing layer including:
a ferromagnetic pinned layer having a magnetic moment;
an antiferromagnetic (AFM) pinning layer exchange coupled to the pinned layer for pinning the magnetic moment of the pinned layer parallel to the head surface and parallel to major thin film planes of the layer of the sensor; and
a chromium spacer layer located between the pinned layer and the free layer;
first and second leads connected to the sensor for conducting a current through the sensor perpendicular to major planes of the layers of the sensor,
a housing;
the magnetic medium being supported in the housing;
a support mounted in the housing for supporting the magnetic head assembly with said head surface facing the magnetic medium so that the magnetic head assembly is in a transducing relationship with the magnetic medium;

a motor for moving the magnetic medium; and a processor connected to the magnetic head assembly and to the motor for exchanging signals with the magnetic head assembly and for controlling movement of the magnetic medium.

16. A magnetic disk drive as claimed in claim 15 including:

a second antiferromagnetic pinning layer exchange coupled to the first AP pinned layer for pinning the magnetic moment of the first AP pinned layer perpendicular to the head surface.

17. A magnetic disk drive as claimed in claim 15 wherein the material spacer layer is aluminum oxide ($Al_2O_3$) or magnesium oxide (MgO).

18. A method of making a magnetic head assembly, that has a head surface for facing a magnetic medium, comprising the steps of:

forming a read head that includes a CPP sensor;

a making of the CPP sensor including the steps of:
forming an antiparallel (AP) pinned layer structure;
forming a ferromagnetic free layer having a magnetic moment that is free to rotate in response to a field signal; and
forming a material spacer layer between the free layer and the AP pinned layer structure;

a making of the free layer including the steps of:
forming first and second free films;
forming the first free film of only iron (Fe) and interfacing the material spacer layer; and
forming the second free film of nickel iron (NiFe) and interfacing the first free film;

a making of the antiparallel (AP) pinned layer structure including the steps of:
forming ferromagnetic first and second antiparallel (AP) pinned layers; and
forming an antiparallel (AP) coupling layer between and interfacing the first and second AP pinned layers;

forming an in-stack longitudinal biasing layer structure within a track width of the sensor;

a making of the in-stack longitudinal biasing layer including the steps of:
forming a ferromagnetic pinned layer having a magnetic moment;
forming an antiferromagnetic (AFM) pinning layer exchange coupled to the pinned layer for pinning the magnetic moment of the pinned layer parallel to the head surface and parallel to major thin film planes of the layer of the sensor; and
forming a chromium spacer layer located between the pinned layer and the free layer;

magnetostatically coupling the free layer to the pinned layer;

making the chromium spacer layer sufficiently thin so that the free layer is weakly antiparallel (AP) coupled to the pinned layer;

making the magnetostatic coupling and the AP coupling supporting one another to stabilize the free layer, but being sufficiently weak in combination to permit the free layer to freely respond to magnetic field signals; and connecting first and second leads to the sensor for conducting a current through the sensor perpendicular to major planes of the layers of the sensor.

19. A method as claimed in claim 18 wherein the material spacer layer is formed of copper (Cu).

20. A method of making a magnetic head assembly, that has a head surface for facing a magnetic medium, comprising the steps of:

forming a read head that includes a CPP sensor;

a making of the CPP sensor including the steps of:
forming an antiparallel (AP) pinned layer structure;
forming a ferromagnetic free layer having a magnetic moment that is free to rotate in response to a field signal; and a making of the free layer including the steps of:
forming first and second free films;
forming the first free film of only iron (Fe);
forming the second free film of nickel iron (NiFe); and
forming a material spacer layer between the free layer and the AP pinned layer structure;

a making of the antiparallel (AP) pinned layer structure including the steps of:
forming ferromagnetic first and second antiparallel (AP) pinned layers;
forming an antiparallel (AP) coupling layer between and interfacing the first and second AP pinned layers; and
the second AP pinned layer interfacing the material spacer layer and being formed of only iron (Fe);

forming an in-stack longitudinal biasing layer structure within a track width of the sensor;

a making of the in-stack lonintudinal biasing layer including the steps of:
forming a ferromagnetic pinned layer having a magnetic moment;
forming an antiferromagnetic (AFM) pinning layer exchange coupled to the pinned layer for pinning the magnetic moment of the pinned layer parallel to the head surface and parallel to major thin film planes of the layer of the sensor;
forming a chromium spacer layer located between the pinned layer and the free layer;
magnetostatically coupling the free layer to the pinned layer;
making the chromium spacer layer sufficiently thin so that the free layer is weakly antiparallel (AP) coupled to the pinned layer;
making the magnetostatic coupling and the AP coupling supporting one another to stabilize the free layer, but being sufficiently weak in combination to permit the free layer to freely respond to magnetic field signals; and
connecting first and second leads to the sensor for conducting a current through the sensor perpendicular to major planes of the layers of the sensor.

21. A method as claimed in claim 20 further comprising the steps of:

making a write head including the steps of:
forming ferromagnetic first and second pole piece layers that have a yoke portion located between a pole tip portion and a back gap portion;
forming a nonmagnetic write gap layer between the pole tip portions of the first and second pole piece layers; and
forming an insulation stack with at least one coil layer embedded therein between the yoke portions of the first and second pole piece layers; and
connecting the first and second pole piece layers being at their back gap portions.

22. A method as claimed in claim 21 including the step of:

forming a second antiferromagnetic pinning layer exchange coupled to the first AP pinned layer for pinning the magnetic moment of the first AP pinned layer perpendicular to the head surface.

23. A method as claimed in claim 21 wherein the material spacer layer is formed of aluminum oxide ($Al_2O_3$) or magnesium oxide (MgO).

24. A method of making a magnetic head assembly, that has a head surface for facing a magnetic medium, comprising the steps of:
  forming a read head that includes a CPP sensor;
  a making of the CPP sensor including the steps of:
    forming an antiparallel (AP) pinned layer structure;
    forming a ferromagnetic free layer having a magnetic moment that is free to rotate in response to a field signal; and
    forming a material spacer layer between the free layer and the AP pinned layer structure;
  a making of the free layer including the steps of:
    forming first and second free films;
    forming the first free film of only iron (Fe); and
    forming the second free film of nickel iron (NiFe);
  a making of the antiparallel (AP) pinned layer structure including the steps of:
    forming ferromagnetic first and second antiparallel (AP) pinned layers;
    forming an antiparallel (AP) coupling layer between and interfacing the first and second AP pinned layers;
    forming the second AP pinned layer of only iron (Fe) and interfacing it with the material spacer layer; and
    forming an in-stack longitudinal biasing layer structure within a track width of the sensor;
  a making of the in-stack longitudinal biasing layer including the steps of:
    forming a ferromagnetic pinned layer having a magnetic moment;
    forming an antiferromagnetic (AFM) pinning layer exchange coupled to the pinned layer for pinning the magnetic moment of the pinned layer parallel to the head surface and parallel to major thin film planes of the layer of the sensor;
    forming a chromium spacer layer located between the pinned layer and the free layer; and
    forming the pinned layer of only iron (Fe);
  magnetostatically coupling the free layer to the pinned layer;
  making the chromium spacer layer sufficiently thin so that the free layer is weakly antiparallel (AP) coupled to the pinned layer;
  making the magnetostatic coupling and the AP coupling supporting one another to stabilize the free layer, but being sufficiently weak in combination to permit the free layer to freely respond to magnetic field signals; and
  connecting first and second leads to the sensor for conducting a current through the sensor perpendicular to major planes of the layers of the sensor.

25. A method as claimed in claim 24 further comprising the steps of:
  making a write head including the steps of:
    forming ferromagnetic first and second pole piece layers that have a yoke portion located between a pole tip portion and a back gap portion;
    forming a nonmagnetic write gap layer between the pole tip portions of the first and second pole piece layers; and
    forming an insulation stack with at least one coil layer embedded therein between the yoke portions of the first and second pole piece layers; and
    connecting the first and second pole piece layers being at their back gap portions.

26. A method as claimed in claim 24 including the step of:
  forming a second antiferromagnetic pinning layer exchange coupled to the first AP pinned layer for pinning the magnetic moment of the first AP pinned layer perpendicular to the head surface.

27. A method as claimed in claim 24 wherein the material spacer layer is formed of aluminum oxide ($Al_2O_3$) or magnesium oxide (MgO).

28. A magnetic head assembly, that has a head surface for facing a magnetic medium, comprising:
  a read head that includes a CPP sensor;
  the CPP sensor including:
    an antiparallel (AP) pinned layer structure;
    a ferromagnetic free layer having a magnetic moment that is free to rotate in response to a field signal; and
    a material spacer layer located between the free layer and the AP pinned layer structure;
  the free layer including:
    first and second free films;
    the first free film consisting of iron (Fe) and interfacing the material spacer layer; and
    the second free film being composed of nickel iron (NiFe) and interfacing the first free film;
  the antiparallel (AP) pinned layer structure including:
    ferromagnetic first and second antiparallel (AP) pinned layers; and
    an antiparallel (AP) coupling layer located between and interfacing the first and second AP pinned layers;
    an in-stack longitudinal biasing layer structure located within a track width of the sensor;
  the in-stack longitudinal biasing structure including:
    a ferromagnetic pinned layer having a magnetic moment;
    an antiferromagnetic (AFM) pinning layer exchange coupled to the pinned layer for pinning the magnetic moment of the pinned layer parallel to the head surface and parallel to major thin film planes of the layer of the sensor; and
    a chromium or ruthenium spacer layer located between the pinned layer and the free layer;
  the free layer being magnetostatically coupled to the pinned layer;
  the chromium spacer layer being sufficiently thin so that the free layer is weakly antiparallel (AP) coupled to the pinned layer;
  the magnetostatic coupling and the AP coupling supporting one another to stabilize the free layer, but being sufficiently weak in combination to permit the free layer to freely respond to magnetic field signals; and
  first and second leads connected to the sensor for conducting a current through the sensor perpendicular to major planes of the layers of the sensor.

29. A magnetic head assembly as claimed in claim 28 wherein the pinned layer consists of iron (Fe).

30. A magnetic head assembly as claimed in claim 28 wherein the second AP pinned layer consists of iron (Fe) and interfaces the material spacer layer.

31. A magnetic head assembly as claimed in claim 30 wherein the pinned layer consists of iron (Fe).

* * * * *